2,983,726
Patented May 9, 1961

2,983,726
METHOD FOR PREPARING SECONDARY AMINO-THIAZOLEDISULFIDES

Charles Malcolm Hendry, Cuyahoga Falls, Ohio, assignor to The B. F. Goodrich Company, New York, N.Y., a corporation of New York No Drawing. Filed Aug. 18, 1959, Ser. No. 834,379

4 Claims. (Cl. 260—247.1)

This invention relates to a new method for preparing secondary aminothiazoledisulfides and more particularly pertains to the single-step process for preparing substantially pure secondary aminothiazoledisulfides by the reaction of a 2-mercaptothiazole with a secondary amine, chlorine and a sulfur halide.

Previously disclosed methods for the preparation of compounds of the aminothiazoledisulfide type have involved several steps and have provided relatively impure products. The secondary aminothiazoledisulfides of the present invention are useful in promoting the cure of rubber and they are particularly useful as delayed action and non-scorching accelerators in rubber compounding. Because the efficiency of the secondary aminothiazoledisulfides is largely dependent upon their purity, the relative simplicity and economy of the process of the present invention as well as the high purity of product makes it all the more important commercially.

The compounds which are embodied in this invention are the secondary aminothiazoledisulfides which conform to the general formula

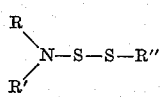

wherein R and R' are the same or different aliphatic, alicyclic or aralkyl groups or R and R' together form a single alkylene chain and R'' is a thiazole radical.

The preparation of the secondary aminothiazoledisulfides in accordance with the process of this invention is exemplified in the following reaction between 2-mercaptobenzothiazole, morpholine, chlorine and a sulfur monohalide.

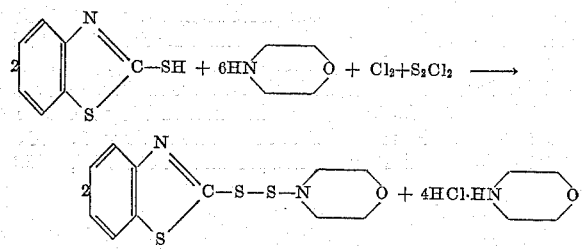

In the above reaction at least 3 moles of the secondary amine per mole of mercaptothiazole must be used in order that there be a two mole excess of amine present to serve as the hydrogen halide acceptor.

In a variation of the above reaction the four moles of secondary amine can be replaced by a four equivalent weight proportion of another basic acid acceptor including the inorganic bases such as sodium hydroxide, sodium carbonate, potassium hydroxide, potassium carbonate, calcium oxide, calcium carbonate and other alkali and alkaline earth metal bases as well as basic aliphtic, alicyclic and heterocyclic tertiary amines such as trimethyl amine, triethyl amine, pyridine, N-methyl morpholine, and the like and others as exemplified in the following equation:

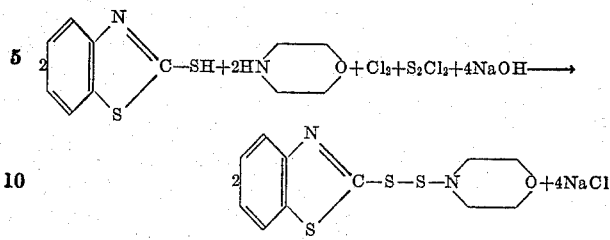

In this procedure the alkaline acceptor is generally added in aqueous solution or dispersion to the reaction mixture near midpoint in the reaction and the secondary aminothiazoledisulfide is isolated from the organic layer after said layer is separated from the aqueous phase. In each of the above-described procedures reaction temperatures of from 25° to 135° C. may be used with the preferred temperature range being from about 40° to about 100° C.

The 2-mercaptothiazoles conforming to the structure R''—SH wherein R'' has the aforementioned designation which are useful in this invention include 2-mercaptothiazole itself, 2-mercapto-4-methyl thiazole, 2-mercapto-4-ethyl thiazole, 2-mercapto-4-n-propyl thiazole, 2-mercapto-4-n-butyl thiazole, 2-mercapto-4,5-dimethyl thiazole, 2-mercapto-4,5-diethyl thiazole, 2-mercapto-4,5-di-n-propyl thiazole, 2-mercapto-4,5-di-n-butyl thiazole, 4-phenyl-2-mercapto thiazole, 4-phenyl-5-methyl-2-mercapto thiazole, 2-mercaptobenzothiazole, 4 - phenyl-2-mercaptobenzothiazole, 6 - phenyl-2-mercaptobenzothiazole, 4 - methyl-2-mercaptobenzothiazole, 6-methyl-2 - mercaptobenzothiazole, 2-mercaptotetrahydrobenzothiazole, 2-mercaptonaphthothiazole and the like. The 2-mercaptobenzothiazoles are preferred in this invention.

The secondary amines useful in the process of the present invention of the type

wherein R and R' have the aforementioned designations include dialkyl amines such as dimethyl amine, diethyl amine, di-n-propyl amine, di-n-butyl amine, di-isobutyl amine, di-n-amyl amine, di-isoamyl amine, di-n-hexyl amine, di-n-heptyl amine, di-cyclohexyl amine, di-n-octyl amine, N-methyl butyl amine, N-ethyl cyclohexyl amine; the dialkaryl amines such as dibenzyl amine; the heterocyclic amines such as morpholine, 2,6-dimethyl morpholine, thiomorpholine, N-methyl piperazine, N-ethyl piperazine, piperidine, 5-ethyl-2-methyl piperidine and pyrrolidine. The preferred secondary amines for the purpose of this invention are the heterocyclic amines and the most preferred are morpholine, and 2,6-dimethyl morpholine.

The sulfur halides useful in this invention are sulfur monochloride, sulfur monobromide and sulfur monoiodide. Most preferred is sulfur monochloride.

The preferred process of this invention involves the reaction of two moles of 2-mercaptothiazole, 6 moles of the secondary amine and one mole of chlorine in an inert organic diluent at a temperature of from about 0° C. to 30° C. followed by the reaction of the product with sulfur monochloride at a temperature of from about 40° C. to about 100° C. The amine hydrochloride is then separated by filtration or water extraction and the aminothiazole disulfide is isolated from the diluent following concentration and cooling.

The inert organic diluents which are useful in the present invention include aromatic hydrocarbons such as benzene, toluene and the xylenes; halogenated aromatic hydrocarbons such as the chlorobenzenes; nitrated aromatic hydrocarbons such as the nitrobenzenes; chlorinated aliphatic hydrocarbons such as chloroform; lower aliphatic esters such as ethyl acetate, propyl acetate, methyl propionate, ethyl propionate and the like; aliphatic cyclic ethers such as dioxane and tetrahydrofuran; polar organic solvents such as dimethyl formamide and alcohols such as ethanol. The preferred organic diluents are toluene, benzene, chloroform and chlorobenzene.

Although the procedures described above and in the following examples disclose the use of an organic solvent such as benzene, xylene, chloroform, and the like, it is to be understood that the reaction can be carried out in the absence of a solvent. The use of a solvent is preferred, however, because of better temperature control which results during the reaction and the greater purity and ease of handling of the product thus obtained.

The following examples are given to illustrate the process of this invention.

Example I

A solution of 167 g. (1.0 mole) of 2-mercaptobenzothiazole and 270 g. (3.1 moles) of morpholine in 1200 ml. of chloroform was stirred and maintained at from 20 to 30° C. in a closed container while 36 g. of chlorine were added above the surface of the liquid. Following the addition of the chlorine the reaction mixture was stirred for an additional 10 minutes and 67.5 g. (0.5 mole) of sulfur monochloride were added dropwise at a temperature maintained between 30 and 60° C. The morpholine hydrochloride then was extracted with water and the 2-benzothiazyl-N-morpholinyl disulfide crystallized from the concentrated and cooled chloroform layer. A yield of 255.4 g. (90% theory) of product having a melting point of 127–130° C. was obtained. Similar yield of the corresponding product was obtained when 2,6-dimethyl morpholine was substituted for morpholine in the above-described procedure.

Example II

The procedure described in Example I was followed with the exception that 1000 ml. of toluene were used as the reaction medium. This procedure produced 252.5 g. (88.7% of theory) of 2-benzothiazyl-N-morpholinyl disulfide having a melting point of 124–130° C.

Example III

The procedure described in Example I was followed with the exceptions that 1200 ml. of benzene were used as the diluent, the chlorine was added at a temperature of from 5–10° C. and the sulfur monochloride was added at a temperature of from 45–72° C. An overall yield of 235.7 g. (83% of theory) of 2-benzothiazyl-N-morpholinyl disulfide having a melting point of 125.5–129.5° C. was obtained.

Example IV

The procedure of Example II was followed except for the use of 285 g. of morpholine. The yield of 2-benzothiazyl-N-morpholinyl disulfide melting at 124–131° C. was 249.4 g. or 87.7% of theory.

I claim:
1. The method for preparing secondary aminobenzothiazoledisulfides comprising reacting substantially two moles of a 2-mercaptobenzothiazole selected from the group consisting of 2-mercaptobenzothiazole, 4-phenyl-2-mercaptobenzothiazole, 6 - phenyl - 2 - mercaptobenzothiazole, 4-methyl-2-mercaptobenzothiazole, 6-methyl-2-mercaptobenzothiazole and 2-mercaptotetrahydrobenzothiazole and substantially six moles of a secondary amine selected from the group consisting of morpholine and 2,6-dimethyl morpholine with substantially one mole of chlorine at a temperature of from about 0° C. to about 30° C. and then reacting the product with substantially one mole of a sulfur monohalide selected from the group consisting of sulfur monochloride, sulfur monobromide and sulfur monoiodide at a temperature of from about 40° C. to about 100° C. in an inert organic diluent selected from the group consisting of toluene, benzene, chloroform and chlorobenzene.

2. The method for preparing 2-benzothiazyl-N-morpholinyl disulfide which comprises reacting substantially two moles of 2-mercaptobenzothiazole and substantially 6 moles of morpholine with substantially one mole of chlorine at a temperature of from about 0 to 30° C. and then reacting the product with substantially one mole of sulfur monochloride at a temperature of from about 40 to 100° C. in benzene.

3. The method for preparing 2-benzothiazyl-N-morpholinyl disulfide which comprises reacting substantially 2 moles of 2-mercaptobenzothiazole and substantially 6 moles of morpholine with substantially one mole of chlorine at a temperature of from about 0 to about 30° C. and then reacting the product with substantially one mole of sulfur monochloride at a temperature of from about 40 to 100° C. in toluene.

4. The method for preparing 2-benzothiazyl-N-morpholinyl disulfide which comprises reacting substantially 2 moles of 2-mercaptobenzothiazole and substantially 6 moles of morpholine with substantially one mole of chlorine at a temperature of from about 0 to about 30° C. and then reacting the product with substantially one mole of sulfur monochloride at a temperature of from about 40 to 100° C. in chloroform.

References Cited in the file of this patent
UNITED STATES PATENTS

| | | |
|---|---|---|
| 2,045,888 | Tschunkur et al. | June 30, 1936 |
| 2,259,164 | Jones | Oct. 14, 1941 |
| 2,271,834 | Carr | Feb. 3, 1942 |
| 2,510,894 | Kleiman | June 6, 1950 |
| 2,730,526 | Kinstler | Jan. 10, 1956 |
| 2,758,995 | Sullivan | Aug. 14, 1956 |
| 2,766,236 | Harman | Oct. 9, 1956 |
| 2,835,670 | Hardman | May 20, 1958 |
| 2,837,519 | Hardman | June 3, 1958 |
| 2,840,556 | Kinstler | June 24, 1958 |